(12) United States Patent
Komamura et al.

(10) Patent No.: US 9,114,743 B2
(45) Date of Patent: Aug. 25, 2015

(54) VEHICLE SEAT WITH INTERNAL CUSHION AIR BAG APPARATUS, AND CUSHION AIR BAG APPARATUS

(75) Inventors: Tatsuya Komamura, Toyota (JP); Hironori Chaya, Toyota (JP); Hideki Takasawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 399 days.

(21) Appl. No.: 13/176,817

(22) Filed: Jul. 6, 2011

(65) Prior Publication Data
US 2012/0007407 A1    Jan. 12, 2012

(30) Foreign Application Priority Data
Jul. 6, 2010    (JP) .................. 2010-153911

(51) Int. Cl.
*B60N 2/427*    (2006.01)
*B60N 2/42*    (2006.01)

(52) U.S. Cl.
CPC .......... *B60N 2/42763* (2013.01); *B60N 2/4221* (2013.01)

(58) Field of Classification Search
USPC .............................. 297/216.1; 280/743.1, 740
See application file for complete search history.

(56) References Cited

U.S. PATENT DOCUMENTS

| | | | | |
|---|---|---|---|---|
| 4,629,248 A * | 12/1986 | Mawbey | ................. | 297/284.11 |
| 5,967,551 A * | 10/1999 | Newkirk et al. | ............. | 280/740 |
| 6,089,599 A * | 7/2000 | Schimmoller et al. | ........ | 280/740 |
| 6,296,292 B1 * | 10/2001 | Feldman | ..................... | 296/68.1 |
| 6,361,067 B1 * | 3/2002 | Varcus et al. | ................. | 280/729 |
| 6,364,348 B1 * | 4/2002 | Jang et al. | ................. | 280/730.2 |
| 6,439,605 B2 * | 8/2002 | Ariyoshi | ....................... | 280/739 |
| 6,536,799 B2 * | 3/2003 | Sinnhuber et al. | ............ | 280/735 |
| 6,669,229 B2 * | 12/2003 | Thomas | ....................... | 280/732 |
| 6,935,684 B2 * | 8/2005 | Sakai | ......................... | 297/216.1 |
| 7,246,677 B2 * | 7/2007 | Fredriksson et al. | ......... | 180/274 |
| 7,306,257 B2 * | 12/2007 | Yoshikawa et al. | ........ | 280/728.2 |
| 7,527,333 B2 * | 5/2009 | Suzuki et al. | .............. | 297/216.1 |
| 7,549,674 B2 * | 6/2009 | Yoshikawa et al. | .......... | 280/740 |
| 7,607,728 B2 * | 10/2009 | Hiruta et al. | ............... | 297/216.1 |
| 7,784,866 B2 * | 8/2010 | Yoshikawa et al. | ........ | 297/216.1 |
| 7,789,417 B2 * | 9/2010 | Yoshikawa et al. | ........ | 280/730.1 |
| 7,878,589 B2 * | 2/2011 | Murakami et al. | ....... | 297/284.11 |

(Continued)

FOREIGN PATENT DOCUMENTS

| | | |
|---|---|---|
| EP | 1775178 A2 | 4/2007 |
| JP | 08-230592 A | 9/1996 |

(Continued)

OTHER PUBLICATIONS

Office Action issued on Jun. 19, 2012 in corresponding Japanese Application No. 2010-153911 and partial English translation thereof.

*Primary Examiner* — David R Dunn
*Assistant Examiner* — Jody Giacoman
(74) *Attorney, Agent, or Firm* — Gifford, Krass, Sprinkle, Anderson & Citkowski, P.C.

(57) ABSTRACT

A cushion air bag includes a waist restraining portion that is arranged at a central portion of a cushion panel, and a gas introducing portion that connects this waist restraining portion to an inflator that is provided at a front portion of a cushion panel. This cushion air bag is inflated such that the waist restraining portion reaches a higher height than the gas introducing portion.

2 Claims, 13 Drawing Sheets

(56) References Cited

U.S. PATENT DOCUMENTS

| | | |
|---|---|---|
| 2001/0011810 A1* | 8/2001 | Saiguchi et al. ............ 280/728.1 |
| 2004/0178616 A1* | 9/2004 | Yoshikawa ..................... 280/748 |
| 2006/0017266 A1* | 1/2006 | Yoshikawa et al. ......... 280/730.1 |
| 2006/0173898 A1* | 8/2006 | Hanson ........................... 707/102 |
| 2006/0175819 A1* | 8/2006 | Abe ............................. 280/743.2 |
| 2007/0132214 A1* | 6/2007 | Suzuki et al. .............. 280/730.1 |
| 2007/0246919 A1 | 10/2007 | Kai |
| 2009/0045606 A1* | 2/2009 | Yoshikawa et al. ......... 280/728.2 |
| 2009/0289479 A1* | 11/2009 | Kumagai ..................... 297/216.1 |
| 2013/0056964 A1* | 3/2013 | Yamashita et al. ......... 280/730.1 |

FOREIGN PATENT DOCUMENTS

| | | |
|---|---|---|
| JP | 2002079861 A | 3/2002 |
| JP | 2007106215 A | 4/2007 |
| JP | 2007-118820 A | 5/2007 |
| JP | 2007283956 A | 11/2007 |
| JP | 2008195202 A | 8/2008 |
| JP | 2009-107579 A | 5/2009 |
| JP | 2009-154743 A | 7/2009 |
| JP | 2010-047223 A | 3/2010 |
| JP | 2010052535 A | 3/2010 |

* cited by examiner

FIG.6A
FIG.6B
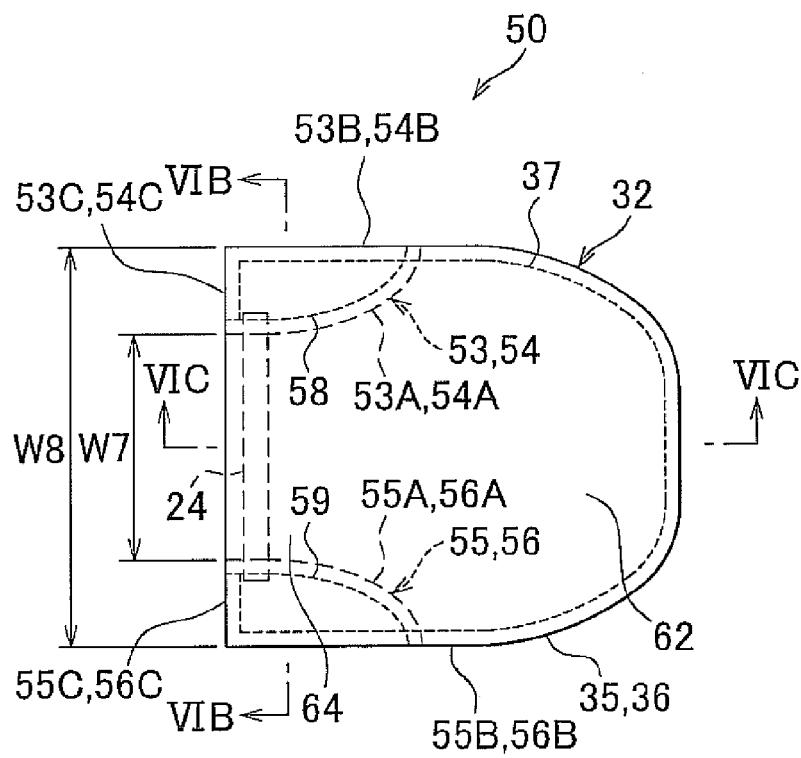
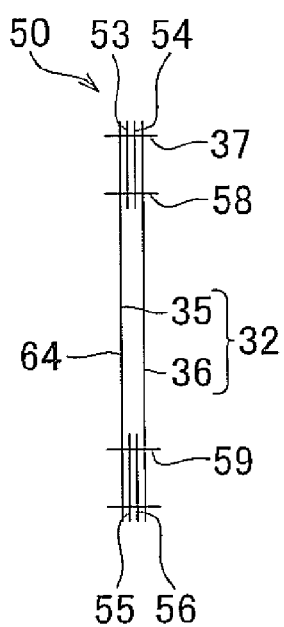
FIG.6C
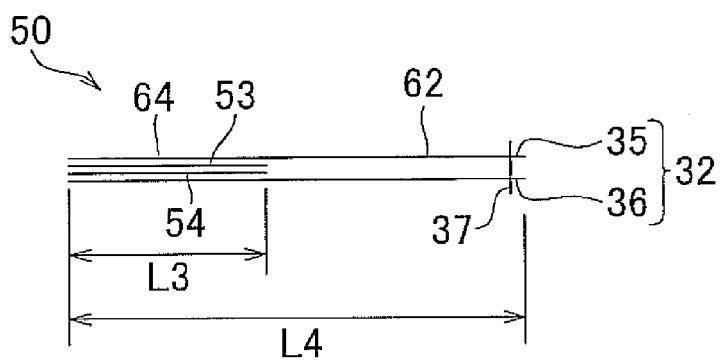

VEHICLE SEAT WITH INTERNAL CUSHION AIR BAG APPARATUS, AND CUSHION AIR BAG APPARATUS

INCORPORATION BY REFERENCE

The disclosure of Japanese Patent Application No. 2010-153911 filed on Jul. 6, 2010 including the specification, drawings and abstract is incorporated herein by reference in its entirety.

BACKGROUND OF THE INVENTION

1. Field of the Invention

The invention relates to a vehicle seat with an internal cushion air bag apparatus, and a cushion air bag apparatus.

2. Description of Related Art

Japanese Patent Application Publication No. 2010-52535 describes a vehicle seat with an internal cushion air bag apparatus that includes a cushion panel that forms a bottom portion of a seat cushion, an inflator provided at a front portion of the cushion panel, and a cushion air bag provided on the cushion panel.

In this vehicle seat, during a frontal collision of the vehicle, the cushion air bag inflates when gas is injected from the inflator. As a result, the thighs of a seated occupant are pushed upward, which enables a so-called submarine phenomenon in which the waist sinks down into the seat cushion to be suppressed.

However, the vehicle seat described in JP-A-2010-52535 has room for improvement to even more effectively inhibit this submarine phenomenon.

SUMMARY OF THE INVENTION

The invention thus provides a vehicle seat with an internal cushion air bag apparatus, and a cushion air bag apparatus, capable of more effectively inhibiting the submarine phenomenon.

A first aspect of the invention relates to a vehicle seat provided with an internal cushion air bag apparatus. This vehicle seat includes a cushion panel that extends in a seat longitudinal direction and that forms a bottom portion of a seat cushion, an inflator that is provided at a front portion of the cushion panel and that injects gas during a frontal collision of a vehicle, and a cushion air bag that has a waist restraining portion arranged at a central portion of the cushion panel and a gas introducing portion that connects the waist restraining portion with the inflator. The cushion air bag is provided on the cushion panel, and when the cushion air bag is inflated, the waist restraining portion reaches a higher height than the gas introducing portion.

According to this vehicle seat, when gas is injected from the inflator during a frontal collision of the vehicle, this gas causes the cushion air bag to inflate.

Here, the cushion air bag has the waist restraining portion arranged at a central portion of the cushion panel, and the gas introducing portion that connects the waist restraining portion to the inflator. This cushion air bag inflates such that the waist restraining portion reaches a higher height than the gas introducing portion. Therefore, the waist of a seated occupant is able to be pushed upward and restrained by the waist restraining portion.

Moreover, when the cushion air bag is inflated, the height of the gas introducing portion is suppressed to be lower than that of the waist restraining portion. Therefore, pressure is able to be effectively generated in the waist restraining portion, while an increase in the capacity of the cushion air bag is able to be minimized. Thus, the waist of a seated occupant is able to be more effectively pushed upward and restrained. As a result, the submarine phenomenon is able to be even more effectively inhibited.

In the first aspect, a front end portion of the gas introducing portion may have a width in a seat width direction that is narrower than the waist restraining portion. Also, the gas introducing portion may be formed so as to become narrower in width in a seat width direction from a rear end portion toward a front end portion of the gas introducing portion.

This structure makes it possible to suppress an increase in the capacity of the cushion air bag even more.

In the vehicle seat of the first aspect, the cushion air bag may include an air bag main body that is formed in a bag shape by two pieces of base cloth being sewn together at peripheral edge portions thereof, and two pieces of additional cloth that are arranged overlapping with the two pieces of base cloth at a front portion of the air bag main body, and sewn to the two pieces of base cloth farther toward an inside than the peripheral edge portions on both sides in a seat width direction of the air bag main body, and that form the gas introducing portion.

As a result, the height of the gas introducing portion when inflated can be suppressed. Also, using the two pieces of additional cloth in this way suppresses the inflation of the gas introducing portion in the seat width direction, so the height of the gas introducing portion when inflated can more effectively be suppressed.

Also, the cushion air bag is able to be inflated in an appropriate shape by, for example, adjusting the lengths in the seat longitudinal direction of the two pieces of additional cloth and the positions of the seams that sew these two pieces of additional cloth to the two pieces of base cloth, and the like. Also, even if the inflated shape of the cushion air bag changes for each vehicle model, this can be accommodated by simply changing the additional cloths, so the air bag main body (i.e., the two pieces of base cloth) can be shared. Further, using the two pieces of additional cloth enables the gas introducing portion that reaches a high temperature and a high pressure to be reinforced.

In the vehicle seat of the first aspect described above, the cushion air bag may include an air bag main body that is formed in a bag shape by two pieces of base cloth being sewn together at peripheral edge portions thereof, and a seam that sews the two pieces of base cloth together farther to an inside than the peripheral edge portions on both sides in a seat width direction of the air bag main body, and forms the gas introducing portion.

According to this vehicle seat, the seam that forms the gas inflating portion sews the two pieces of base cloth together at a position to the inside of the peripheral edge portions that are sewn on both sides in the seat width direction of the air bag main body. As a result, the height of the gas introducing portion when inflated is able to be suppressed.

Moreover, the cushion air bag can be inflated in an appropriate shape by, for example, adjusting the position of this seam. Also, even if the inflated shape of the cushion air bag changes for each vehicle model, this can be accommodated by simply changing the seam, so the air bag main body (i.e., the two pieces of base cloth) can be shared.

In the vehicle seat of the first aspect described above, the cushion air bag may include an air bag main body that is formed in a bag shape by two pieces of base cloth being sewn together at peripheral edge portions thereof, and a connecting portion that is provided inside of a portion corresponding to the gas introducing portion of the air bag main body and that connects the two pieces of base cloth together.

According to this vehicle seat, the connecting portion is provided inside the portion corresponding to the gas introducing portion of the air bag main body, and the two pieces of base cloth that form the air bag main body are connected by this connecting portion. Therefore, the height of the gas introducing portion when inflated can be restricted by this connecting portion.

A second aspect of the invention relates to a cushion air bag apparatus for a vehicle seat. This cushion air bag apparatus includes an inflator, and an air bag main body that is formed in a bag shape by two pieces of generally rectangular base cloth being sewn together at peripheral edge portions thereof such that an open portion is formed. The inflator is provided inside the air bag main body so as to block off the open portion. The air bag main body has a waist restraining portion formed on a side opposite the inflator, and an introducing portion that connects the waist restraining portion and the inflator together, and that reaches a height that is lower than the height of the waist restraining portion when the air bag is inflated.

When this seat cushion air bag is applied to a seat cushion of a vehicle seat, during a frontal collision of the vehicle, gas is injected from the inflator, and the cushion air, bag is inflated by this gas. When the air bag is inflated, the height of the waist restraining portion is higher than that of the gas introducing portion. As a result, the waist of a seated occupant is able to be pushed up and restrained by this waist restraining portion.

As described in detail above, the aspects described above make it possible to even more effectively inhibit the submarine phenomenon.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6A is a plan view of an inflator and a cushion air bag according to a second example embodiment of the invention;

FIG. 6B is a sectional view taken along line 6B-6B of the cushion air bag shown in FIG. 6A;

FIG. 6C is a sectional view taken along line 6C-6C of the cushion air bag shown in FIG. 6A;

DETAILED DESCRIPTION OF EMBODIMENTS

Figure 1:
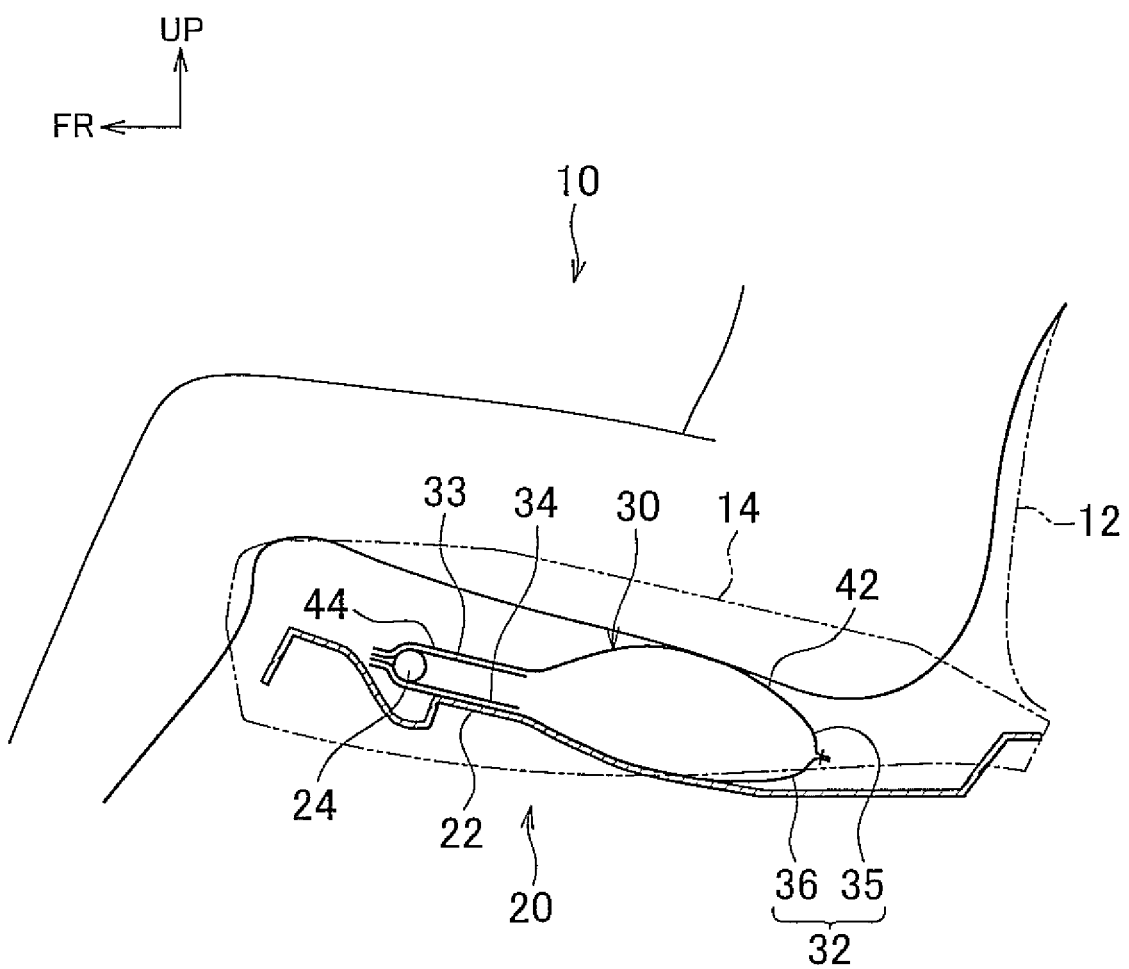
FIG. 1 is a sectional view as viewed from the side of a main portion of a vehicle seat according to a first example embodiment of the invention.

First a first example embodiment of the invention will be described.

In the drawings, an UP arrow indicates up in the vertical direction of the vehicle seat, and an FR arrow indicates the front in the longitudinal direction of the vehicle seat. Also, in the sectional views from among the drawings described below, the gaps between the members are shown exaggerated to clarify the structures of the members.

As shown in FIG. 1, a vehicle seat 10 according to the first example embodiment of the invention is used as a front seat in a vehicle such as a passenger automobile, for example, and includes a seat back 12 and a seat cushion 14.

A cushion air bag apparatus 20 is provided inside the seat cushion 14. This cushion air bag apparatus 20 includes a cushion panel 22, an inflator 24, and a cushion air bag 30.

The cushion panel 22 forms a bottom portion of the seat cushion 14 and extends in the seat longitudinal direction (longitudinal direction of the vehicle seat) and the seat width direction (width direction of the vehicle seat). The inflator 24 is formed in a cylindrical columnar shape, and is arranged extending lengthwise in the seat width direction at a front portion of the cushion panel 22. The inflator 24 is configured to inject a gas upon receiving a signal from an ECU, not shown, during a frontal collision of the vehicle.

A frontal collision of the vehicle in this case includes a case in which an actual frontal impact to the vehicle is detected, as well as a case in which a frontal impact to the vehicle is predicted.

The cushion air bag 30 is provided on the cushion panel 22 (i.e., between the cushion panel 22 and a cushion pad, not shown). This cushion air bag 30 is formed having an air bag main body 32 and two pieces of additional cloth 33 and 34, as shown in FIGS. 2A to 2C and 3.

Figures 2A, 2B:
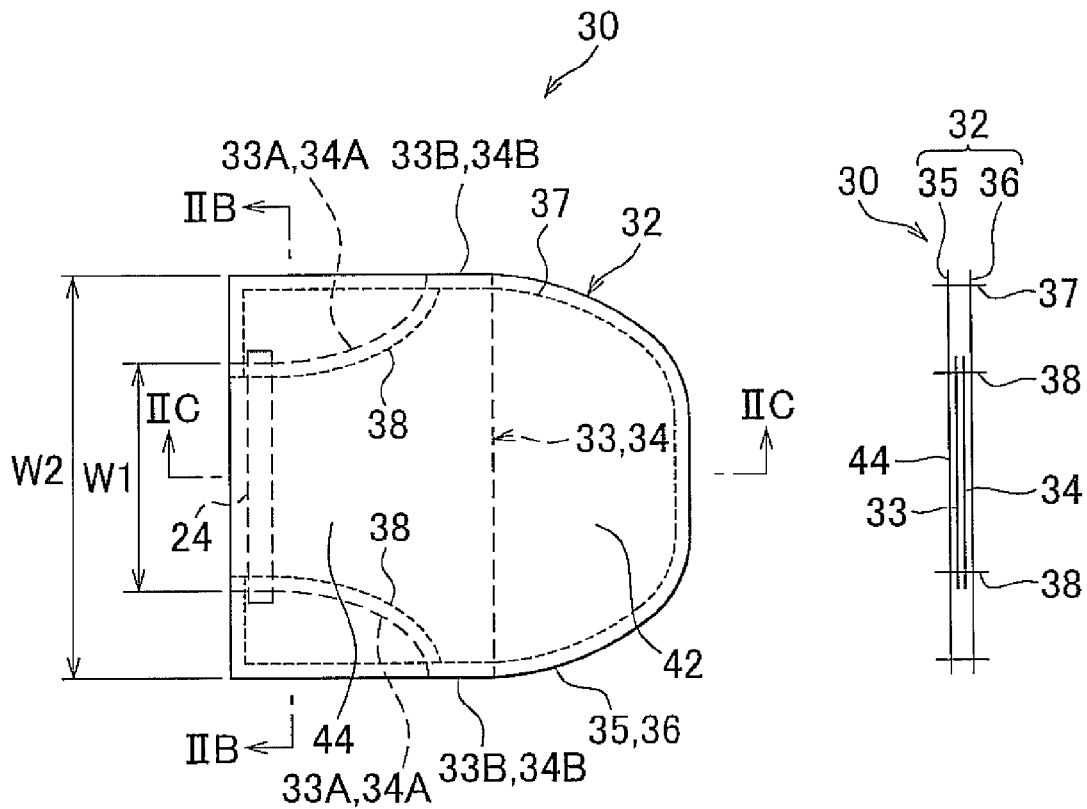
FIG. 2A is a plan view of an inflator and a cushion air bag shown in FIG. 1.
FIG. 2B is a sectional view taken along line 2B-2B of the cushion air bag shown in FIG. 2A.

The air bag main body 32 is formed by two pieces of base cloth 35 and 36 that are generally rectangular when viewed from above. These pieces of base cloth 35 and 36 are sewn together at peripheral edge portions thereof by a seam (i.e., a sewn portion) 37, as shown in FIG. 2A. As a result, the air bag main body 32 forms a bag shape that is open at a portion of the front end portion. The inflator 24 described above is provided inside the air bag main body 32 so as to block this opening.

The pieces of additional cloth 33 and 34 are formed shorter in the seat longitudinal direction than the air bag main body 32. These pieces of additional cloth 33 and 34 are provided inside the front portion of the air bag main body 32, and overlap with the two pieces of base cloth 35 and 36.

Side portions 33A and 34A at the front and both sides in the seat width direction of the additional cloth 33 are formed curved inward in a concave shape on the outside in the seat width direction. As a result, the additional cloth 33 is formed in a general T-shape when viewed from above, gradually narrowing in width from the rear end portion toward the front end portion. The other additional cloth 34 is formed in the same shape as the one additional cloth 33.

Also, the side portions 33A and 34A of these two pieces of additional cloth 33 and 34 are sewn together as well as to the two pieces of base cloth 35 and 36 by seams (i.e., sewn portions) 38 along the side portions 33A and 34A. Moreover, side portions 33B and 34B that are to the rear of the side portions 33A and 34A of these two pieces of additional cloth 33 and 34 are sewn together as well as to the two pieces of base cloth 35 and 36 by the seam 37 described above.

This structure gives the cushion air bag 30, a waist restraining portion 42 and a gas introducing portion 44.

That is, the waist restraining portion 42 is formed by a portion of the cushion air bag 30 that is to the rear of the two pieces of additional cloth 33 and 34, and is arranged at a central portion of the cushion panel 22, as shown in FIG. 1. Meanwhile, the gas introducing portion 44 is formed by a portion of the cushion air bag 30 where the two pieces of additional cloth 33 and 34 are provided, and connects the waist restraining portion 42 and the inflator 24 together.

Also, this gas introducing portion 44 is formed so as to become narrower in width in the seat width direction from the rear end portion toward the front end portion, as shown in FIG. 2A. That is, the width W1 of the front end portion of the gas introducing portion 44 is narrower than the width W2 of the rear end portion of the gas introducing portion 44.

Also, with this cushion air bag 30, forming the gas introducing portion 44 by the two pieces of additional cloth 33 and 34 described above restricts the height of the gas introducing portion 44 when inflated, so an apex of the waist restraining portion 42 will inflate to a greater height than an apex of the gas introducing portion 44 will (see FIG. 1).

Next, the operation and effects of the first example embodiment of the invention will be described.

As shown in FIG. 1, with this vehicle seat 10, when gas is injected from the inflator 24 during a frontal collision of the vehicle, this gas causes the cushion air bag 30 to inflate.

Here, the cushion air bag 30 includes the waist restraining portion 42 that is arranged at a central portion of the cushion panel 22, and the gas introducing portion 44 that connects the waist restraining portion 42 and the inflator 24 together. This cushion air bag 30 inflates such that the apex of the waist restraining portion 42 reaches a higher height than the apex of the gas introducing portion 44. As a result, the waist of a seated occupant P is able to be pushed upward and restrained by this waist restraining portion 42.

In addition, when the cushion air bag 30 inflates, the height of the gas introducing portion 44 is suppressed compared with the waist restraining portion 42. That is, the apex of the gas introducing portion 44 will be at a lower height than the apex of the waist restraining portion 42. Therefore, pressure can be effectively generated in the waist restraining portion 42, while an increase in the capacity of the cushion air bag 30 is minimized, which enables the waist of the seated occupant P to be pushed upward and restrained even more effectively. As a result, the submarine phenomenon is able to be more effectively suppressed.

Also, the gas introducing portion 44 is formed by the two pieces of additional cloth 33 and 34, as shown in FIG. 2A, so the width in the seat width direction becomes narrower from the rear end portion toward the front end portion. Accordingly, an increase in the capacity of the cushion air bag 30 can be suppressed even more.

Moreover, using the two pieces of additional cloth 33 and 34 suppresses the inflation of the gas introducing portion 44 in the seat width direction, so the height of the gas introducing portion 44 when inflated can be more effectively suppressed. As a result, the capacity of the cushion air bag 30 can be even more effectively inhibited from increasing.

Figure 2C:
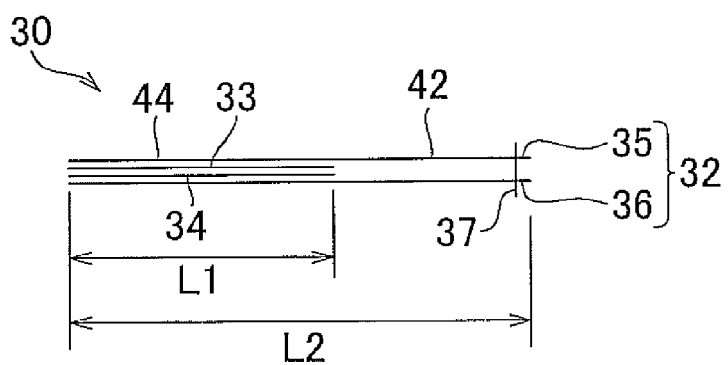
FIG. 2C is a sectional view taken along line 2C-2C of the cushion air bag shown in FIG. 2A.
Figure 3:
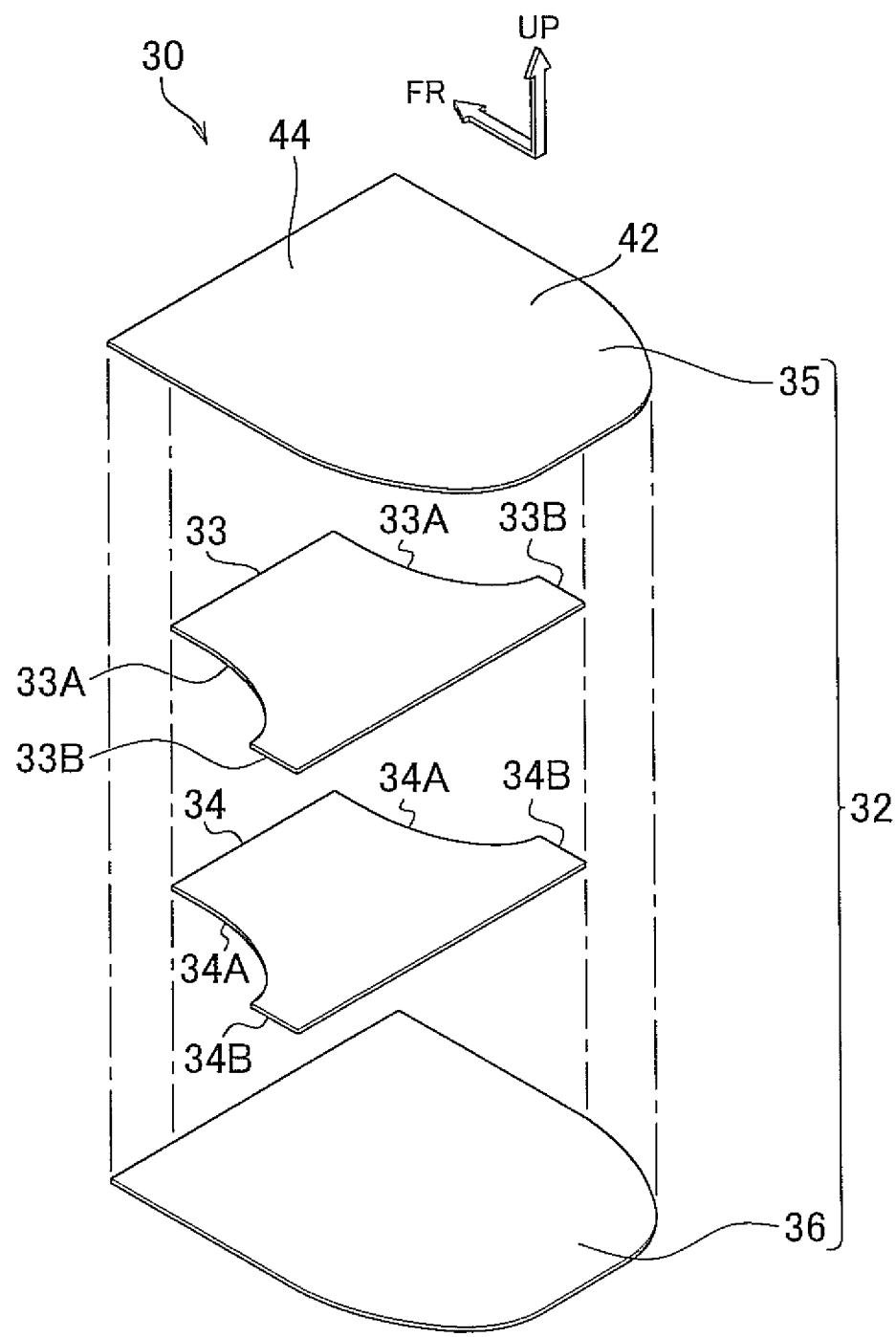
FIG. 3 is an exploded perspective view of the cushion air bag shown in FIG. 1.

Also, the cushion air bag 30 is able to be inflated in an appropriate shape by, for example, adjusting the lengths in the seat longitudinal direction of the two pieces of additional cloth 33 and 34 and the positions of the seams 38 that sew these two pieces of additional cloth 33 and 34 to the two pieces of base cloth 35 and 36, and the like. That is, the length L1 in the seat longitudinal direction of the gas introducing portion 44 can be changed to an appropriate length with respect to the overall length L2 of the cushion air bag 30, as shown in FIG. 2C.

Also, even if the inflated shape of the cushion air bag 30 changes for each vehicle model, this can be accommodated by simply changing the additional cloths 33 and 34, so the air bag main body 32 (i.e., the two pieces of base cloth 35 and 36) can be shared. As a result, an increase in cost can be suppressed.

Further, using the two pieces of additional cloth 33 and 34 enables the gas introducing portion 44 that reaches a high temperature and a high pressure to be reinforced.

Moreover, even if the cushion panel 22 (see FIG. 1) and the inflator 24 that is provided at the front portion of the cushion panel 22 are appropriated from a related cushion air bag apparatus, the position of the inflator 24 and the specifications of the inflator 24 itself do not need to be changed, which also enables an increase in cost to be suppressed.

Next, a modified example of the first example embodiment of the invention will be described.

Figures 4A, 4B:
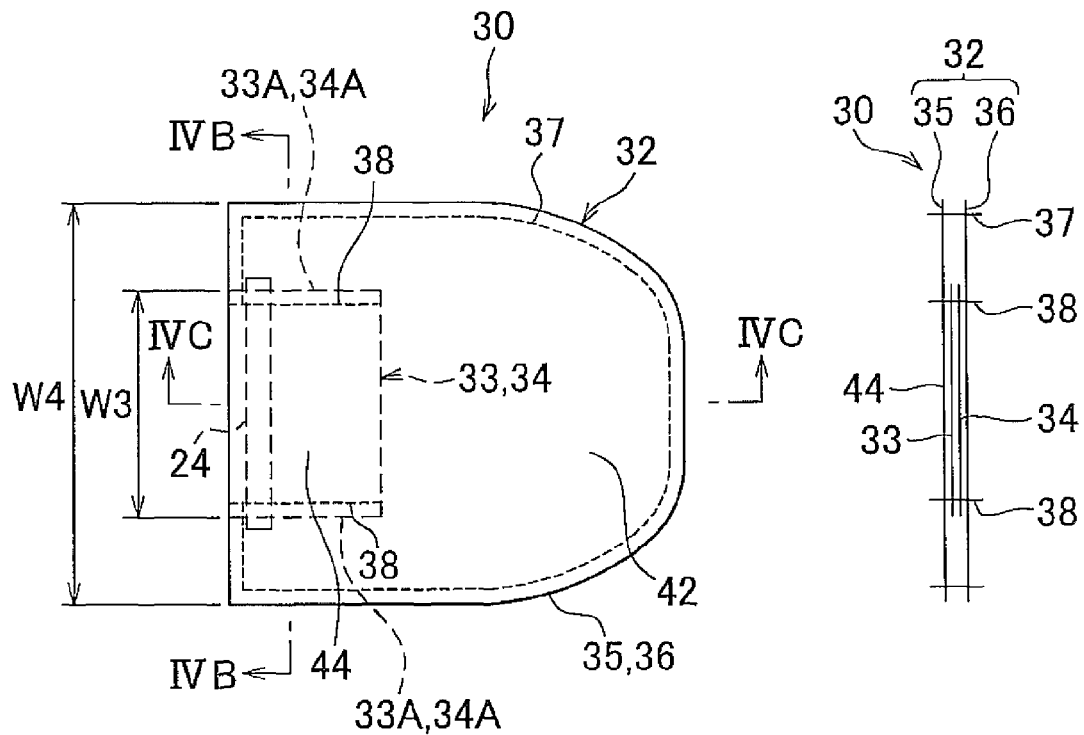
FIG. 4A is a plan view of a first modified example of the cushion air bag shown in FIG. 1.
FIG. 4B is a sectional view taken along line 4B-4B of the cushion air bag shown in FIG. 4A.
Figure 4C:
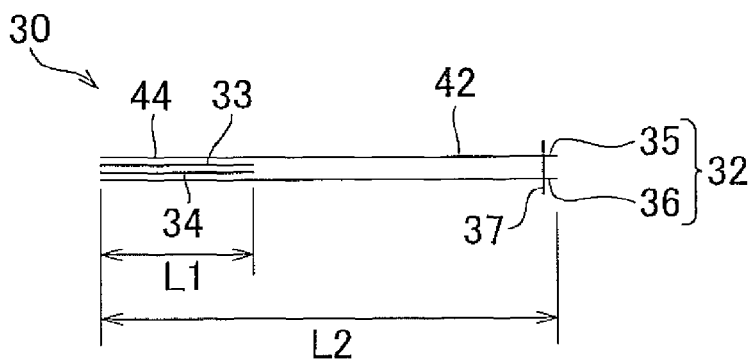
FIG. 4C is a sectional view taken along line 4C-4C of the cushion air bag shown in FIG. 4A.

In the first example embodiment of the invention, the two pieces of additional cloth 33 and 34 are formed generally T-shaped when viewed from above, but they may also be formed in rectangular shapes when viewed from above, as shown in FIGS. 4A to 4C.

Also, in this case, the two pieces of additional cloth 33 and 34 may be formed with a narrower width in the seat width direction than the air bag main body 32, and they may be sewn together as well as to the two pieces of base cloth 35 and 36 by the seams 38 that extend along the side portions 33A and 34A on both sides in the seat width direction.

In this way, according to this structure, the gas introducing portion 44 may be formed with a narrower width in the seat width direction than the waist restraining portion 42. That is, in this modified example, the width W3 in the seat width direction of the gas introducing portion 44 is narrower than the width W4 of the waist restraining portion 42.

Figures 5A, 5B:
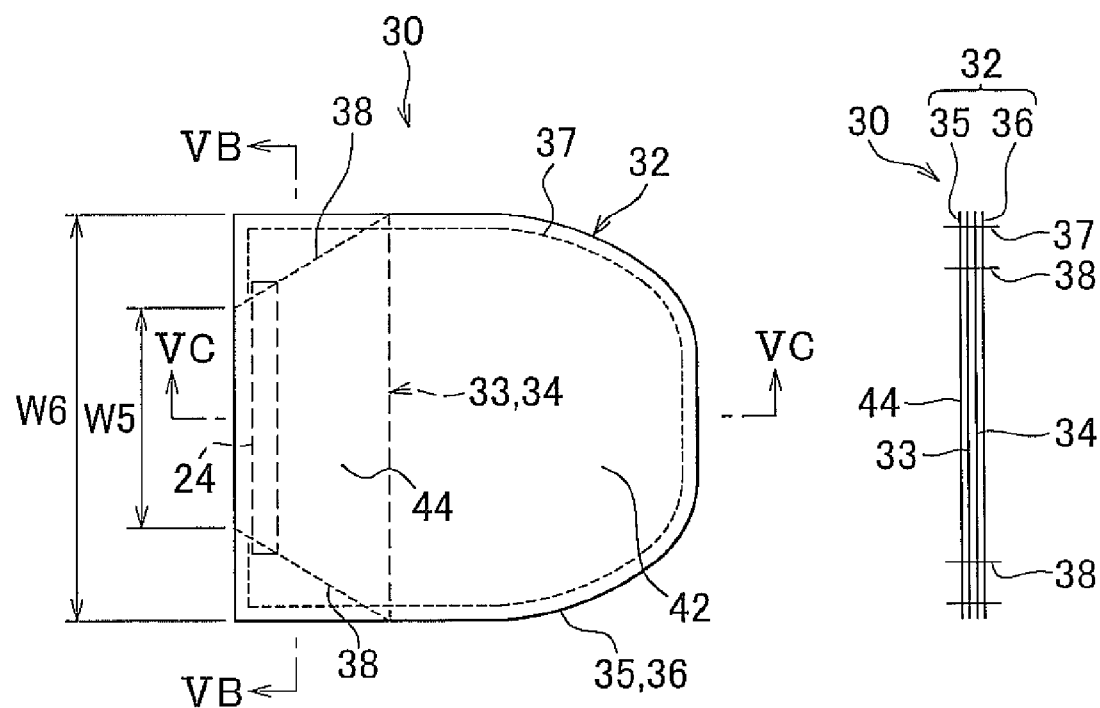
FIG. 5A is a plan view of a second modified example of the cushion air bag shown in FIG. 1.
FIG. 5B is a sectional view taken along line 5B-5B of the cushion air bag shown in FIG. 5A.
Figure 5C:
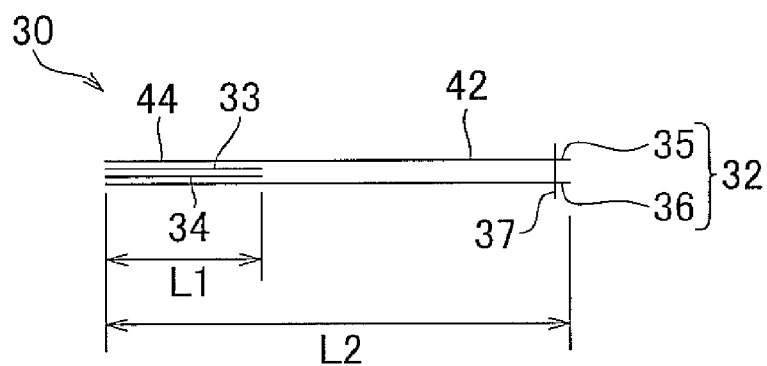
FIG. 5C is a sectional view taken along line 5C-5C of the cushion air bag shown in FIG. 5A.

Also, as shown in FIGS. 5A to 5C, the two pieces of additional cloth 33 and 34 may be formed in strips that are long in the seat width direction and have generally the same width as the air bag main body 32.

In this case, the two pieces of additional cloth 33 and 34 may be sewn together as well as to the two pieces of base cloth 35 and 36 by the seams 38 that extend, in directions that are slanted with respect to the seat longitudinal direction, farther toward the outside in the seat width direction toward the rear in the seat longitudinal direction.

Also, in this way, according to this structure, the gas introducing portion 44 may be formed so as to become narrower in width in the seat width direction from the rear end portion toward the front end portion. That is, in this modified example, the width W5 of the front end portion of the gas introducing portion 44 is narrower than the width W6 of the rear end portion of the gas introducing portion 44.

Also, in the first example embodiment of the invention, the two pieces of additional cloth 33 and 34 are provided on the inside of the air bag main body 32, but they may also be provided on the outside of the air bag main body 32.

Also, the entire cushion air bag 30 is arranged on the cushion panel 22. Alternatively, however, a portion of the cushion air bag 30 may be arranged on a cushion spring and the remaining portion of the cushion air bag 30 may be arranged on the cushion panel 22.

The structures described above are also able to display similar operation and effects as the first example embodiment of the invention described above.

Also, the vehicle seat 10 may be used as a rear seat, as well as a front seat.

Next, a second example embodiment of the invention will be described.

In the second example embodiment of the invention, the structure of the cushion air bag is changed as described below with respect to the first example embodiment described above.

That is, a cushion air bag 50 in the second example embodiment of the invention is formed with an air bag main body 32 and a plurality (four) of additional cloths 53, 54, 55, and 56, as shown in FIGS. 6A to 6C.

The air bag main body 32 has the same structure as it does in the first example embodiment of the invention described above.

The additional cloth 53 is the same shape as the additional cloth 54, and the additional cloth 55 is the same shape as the additional cloth 56. The plurality of additional cloths 53, 54, 55, and 56 are shorter in the seat longitudinal direction than the air bag main body 32, and are provided inside the front portion of the air bag main body 32.

Also, the additional cloths 53 and 54 are arranged overlapping each other at a corner portion at the front on one side (i.e., the right side) in the seat width direction of the air bag main body 32, and the additional cloths 55 and 56 are arranged overlapping each other at a corner portion at the front on the other side (i.e., the left side) in the seat width direction of the air bag main body 32. The additional cloths 53 and 54 and the additional cloths 55 and 56 are arranged symmetrically about a central portion in the seat width direction of the air bag main body 32.

Further, side portions 53A and 54A on the inside in the seat width direction of two of the additional cloths 53 and 54 are shaped curved in a convex shape toward the inside in the seat width direction. These side portions 53A and 54A of the additional cloths 53 and 54 are sewn together as well as to the two pieces of base cloth 35 and 36 by a seam (i.e., a sewn portion) 58 along the side portions 53A and 54A. Also, side portions 53B and 54B on the outside in the seat width direction, and front end portions 53C and 54C, of the additional cloths 53 and 54 are sewn together as well as to the two pieces of base cloth 35 and 36 by the seam 37 along the peripheral edge portion of the air bag main body 32.

Similarly, side portions 55A and 56A on the inside in the seat width direction of the other two additional cloths 55 and 56 are shaped curved in a convex shape toward the inside in the seat width direction. These side portions 55A and 56A of the other additional cloths 55 and 56 are sewn together as well as to the two pieces of base cloth 35 and 36 by a seam (i.e., a sewn portion) 59 along the side portions 55A and 56A. Also, side portions 55B and 56B on the outside in the seat width direction, and front end portions 55C and 56C, of the additional cloths 55 and 56 are sewn together as well as to the two pieces of base cloth 35 and 36 by the seam 37 along the peripheral edge portion of the air bag main body 32.

This structure gives the cushion air bag 50 a waist restraining portion 62 and a gas introducing portion 64.

That is, the waist restraining portion 62 is formed by a portion of the cushion air bag 50 that is to the rear of the plurality of additional cloths 53, 54, 55, and 56, and is arranged at a central portion of the cushion panel 22 (see FIG. 1). Meanwhile, the gas introducing portion 64 is formed by a portion of the cushion air bag 50 that is between the additional cloths 53 and 54 and the additional cloths 55 and 56 in the seat width direction, and connects the waist restraining portion 62 and the inflator 24 together.

Also, this gas introducing portion 64 is formed so as to become narrower in width in the seat width direction from the rear end portion toward the front end portion. That is, the width W7 of the front end portion of the gas introducing portion 64 is narrower than the width W8 of the rear end portion of the gas introducing portion 64.

Also, with this cushion air bag 50, forming the gas introducing portion 64 by the pair of seams 58 and 59 described above restricts the height of the apex of the gas introducing portion 64 when inflated, so the apex of the waist restraining portion 62 will inflate to a greater height than the apex of the gas introducing portion 64 will (just as in FIG. 1).

Next, the operation and effects of the second example embodiment of the invention will be described.

With a vehicle seat, not shown, provided with the cushion air bag 50 of the second example embodiment of the invention, when gas is injected from the inflator 24 during a frontal collision of the vehicle, this gas causes the cushion air bag 50 to inflate.

Here, the cushion air bag 50 includes the waist restraining portion 62 that is arranged at a central portion of the cushion panel 22 (see FIG. 1), and the gas introducing portion 64 that connects the waist restraining portion 62 and the inflator 24 together. This cushion air bag 50 inflates such that the apex of the waist restraining portion 62 reaches a higher height than the apex of the gas introducing portion 64. As a result, the waist of a seated occupant is able to be pushed upward and restrained by this waist restraining portion 62.

In addition, when the cushion air bag 50 inflates, the height of the apex of the gas introducing portion 64 is suppressed compared with the waist restraining portion 62. Therefore, pressure can be effectively generated in the waist restraining portion 62, while an increase in the capacity of the cushion air bag 50 is minimized, which enables the waist of the seated occupant to be pushed upward and restrained even more effectively. As a result, the submarine phenomenon is able to be more effectively suppressed.

Also, the gas introducing portion 64 is formed by the pair of seams 58 and 59, as shown in FIG. 6A, so the width in the seat width direction becomes narrower from the rear end portion toward the front end portion. Accordingly, an increase in the capacity of the cushion air bag 50 can be suppressed even more.

Also, the cushion air bag 50 is able to be inflated in an appropriate shape by, for example, adjusting the lengths in the seat longitudinal direction of the plurality of additional cloths 53, 54, 55, and 56 and the positions of the pair of seams 58 and 59, and the like. That is, the length L3 in the seat longitudinal direction of the gas introducing portion 64 can be changed to an appropriate length with respect to the overall length L4 of the cushion air bag 50.

Also, even if the inflated shape of the cushion air bag 50 changes for each vehicle model, this can be accommodated by simply changing the additional cloths 53, 54, 55, and 56 and the seams 58 and 59, so the air bag main body 32 (i.e., the two pieces of base cloth 35 and 36) can be shared. As a result, an increase in cost can be suppressed.

Moreover, even if the cushion panel 22 (see FIG. 1) and the inflator 24 that is provided at the front portion of the cushion panel 22 are appropriated from a related cushion air bag apparatus, the position of the inflator 24 and the specifications of the inflator 24 itself do not need to be changed, which also enables an increase in cost to be suppressed.

Next, a modified example of the second example embodiment of the invention will be described.

Figures 7A, 7B:
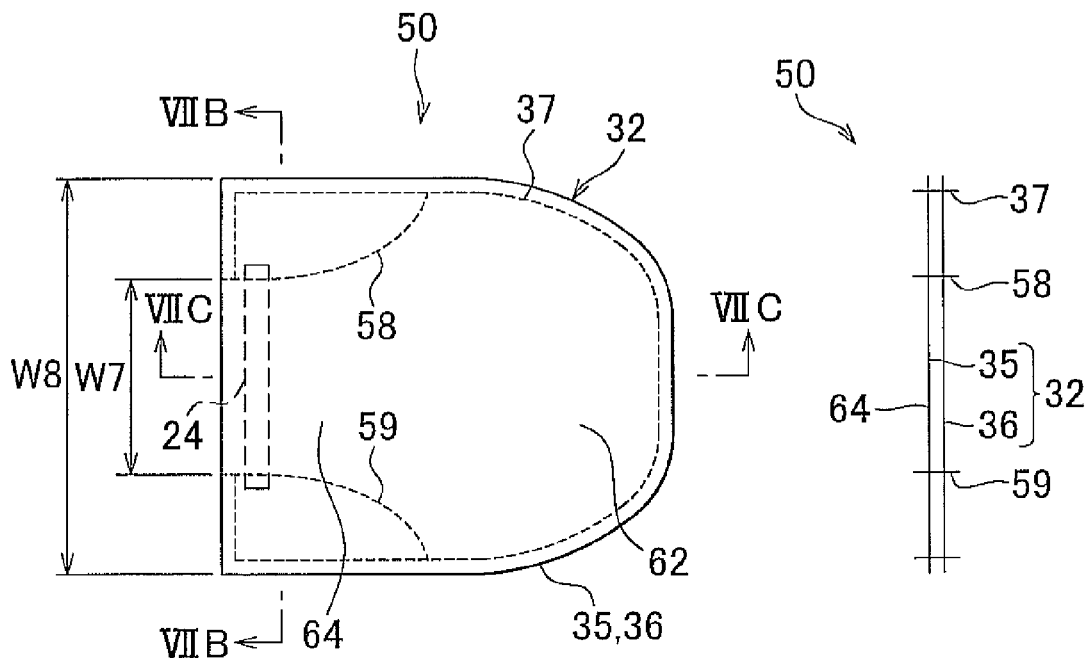
FIG. 7A is a plan view of a modified example of the cushion air bag shown in FIG. 6A.
FIG. 7B is a sectional view taken along line 7B-7B of the cushion air bag shown in FIG. 7A.
Figure 7C:
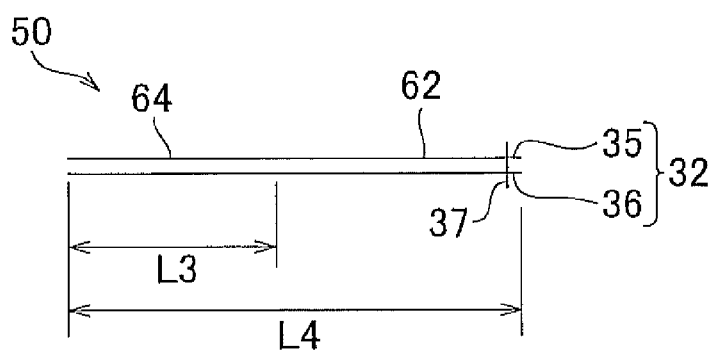
FIG. 7C is a sectional view taken along line 7C-7C of the cushion air bag shown in FIG. 7A.

In the second example embodiment of the invention, the cushion air bag 50 includes the plurality of additional cloths 53, 54, 55, and 56. Alternatively, however, the plurality of additional cloths 53, 54, 55, and 56 (see FIGS. 6A to 6C) may be omitted, as shown in FIGS. 7A to 7C.

Also, the plurality of additional cloths 53, 54, 55, and 56 are provided on the inside the air bag main body. 32, but they may also be provided on the outside of the air bag main body 32.

The structures described above are also able to display similar operation and effects as the second example embodiment of the invention described above.

Next, a third example embodiment of the invention will be described.

In the third example embodiment of the invention, the structure of the cushion air bag is changed as described below with respect to the first example embodiment described above.

Figures 8A, 8B:
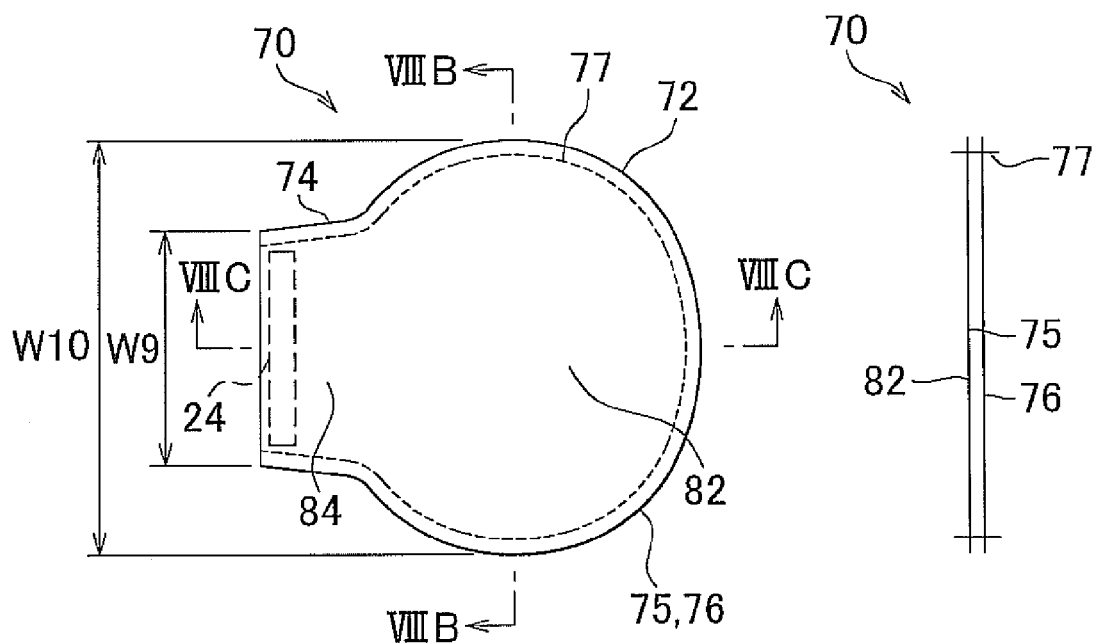
FIG. 8A is a plan view of an inflator and a cushion air bag according to a third example embodiment of the invention.
FIG. 8B is a sectional view taken along line 8B-8B of the cushion air bag shown in FIG. 8A.
Figure 8C:
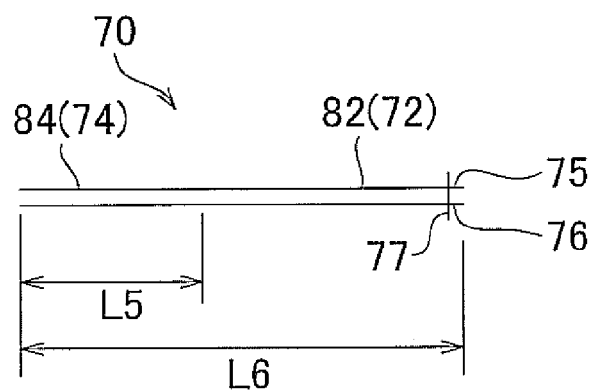
FIG. 8C is a sectional view taken along line 8C-8C of the cushion air bag shown in FIG. 8A.

That is, a cushion air bag 70 in the third example embodiment of the invention is formed with an air bag main body 32 and two pieces of base cloth 75 and 76, as shown in FIGS. 8A to 8C.

The cloths 75 and 76 are the same shape, and each have a circular portion 72 formed in a generally circular shape when viewed from above, and a rectangular portion 74 that is formed in front of the circular portion 72. The rectangular portion 74 is formed with a narrower width than the circular portion 72. Also, the two pieces of base cloth 75 and 76 are sewn together at the peripheral edge portions by a seam (i.e., a sewn portion) 77, such that the cushion air bag 70 is formed in a bag shape.

This structure gives the cushion air bag 70 a waist restraining portion 82 and a gas introducing portion 84.

That is, the waist restraining portion 82 is formed by a portion corresponding to the circular portion 72 of the cushion air bag 70, and is arranged at a central portion of the cushion panel 22 (see FIG. 1). Meanwhile, the gas introducing portion 84 is formed by a portion corresponding to the rectangular portion 74 of the cushion air bag 70, and connects the waist restraining portion 82 and the inflator 24 together.

Also, this gas introducing portion 84 is formed with a narrower width in the seat width direction than the waist restraining portion 82. That is, the width W9 in the seat width direction of the gas introducing portion 84 is narrower than the width W10 of the waist restraining portion 82.

Also, with this cushion air bag 70, forming the rectangular portion 74 with a narrower width than the circular portion 72 restricts the height of the gas introducing portion 84 when inflated, so the apex of the waist restraining portion 82 will inflate to a greater height than the apex of the gas introducing portion 84 will (just as in FIG. 1).

Next, the operation and effects of the third example embodiment of the invention will be described.

With a vehicle seat, not shown, provided with the cushion air bag 70 of the third example embodiment of the invention, when gas is injected from the inflator 24 during a frontal collision of the vehicle, this gas causes the cushion air bag 70 to inflate.

Here, the cushion air bag 70 includes the waist restraining portion 82 that is arranged at a central portion of the cushion panel 22 (see FIG. 1), and the gas introducing portion 84 that connects the waist restraining portion 82 and the inflator 24 together. This cushion air bag 70 inflates such that the apex of the waist restraining portion 82 reaches a higher height than the apex of the gas introducing portion 84. As a result, the waist of a seated occupant is able to be pushed upward and restrained by this waist restraining portion 82.

In addition, when the cushion air bag 70 inflates, the height of the apex of the gas introducing portion 84 is suppressed compared with the apex of the waist restraining portion 82. Therefore, pressure can be effectively generated in the waist restraining portion 82, while an increase in the capacity of the cushion air bag 70 is minimized, which enables the waist of the seated occupant to be pushed upward and restrained even more effectively. As a result, the submarine phenomenon is able to be more effectively suppressed.

Also, the gas introducing portion 84 is formed narrower in width than the waist restraining portion 82. Accordingly, an increase in the capacity of the cushion air bag 70 is able to be suppressed even more.

Moreover, even if the cushion panel 22 (see FIG. 1) and the inflator 24 that is provided at the front portion of the cushion panel 22 are appropriated from a related cushion air bag apparatus, the position of the inflator 24 and the specifications of the inflator 24 itself do not need to be changed, which also enables an increase in cost to be suppressed.

In the third example embodiment of the invention, the length L5 in the seat longitudinal direction of the gas introducing portion 84 can be changed to an appropriate length with respect to the overall length L6 of the cushion air bag 70 by changing the length in the seat longitudinal direction of the rectangular portion 74.

Next, a fourth example embodiment of the invention will be described.

In the fourth example embodiment of the invention, the structure of the cushion air bag is changed as described below with respect to the first example embodiment described above.

Figure 9:
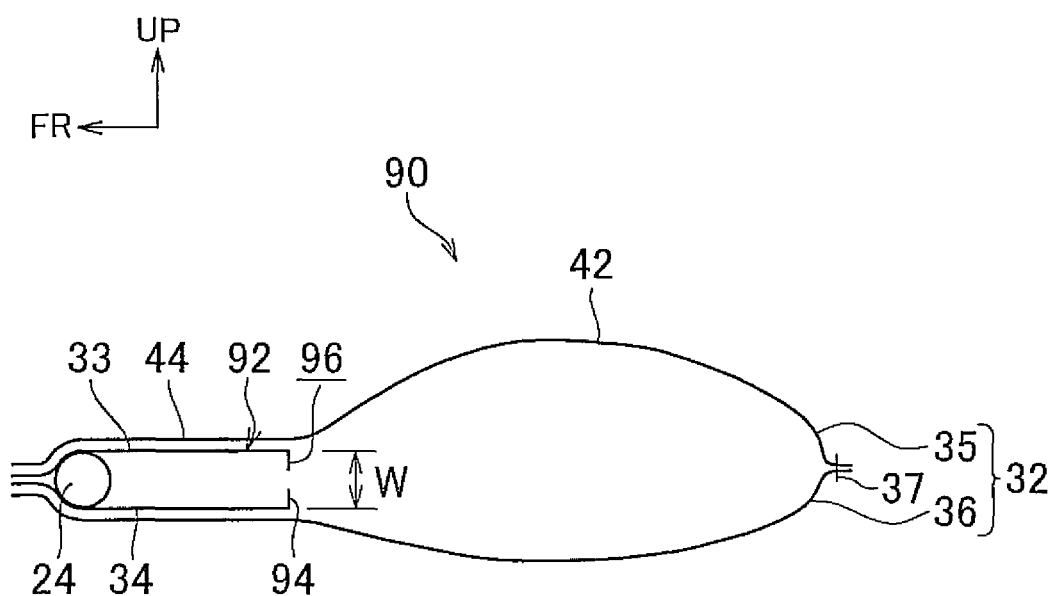
FIG. 9 is a sectional view as viewed from the side of an inflator and a cushion air bag according to a fourth example embodiment of the invention.
Figure 10:
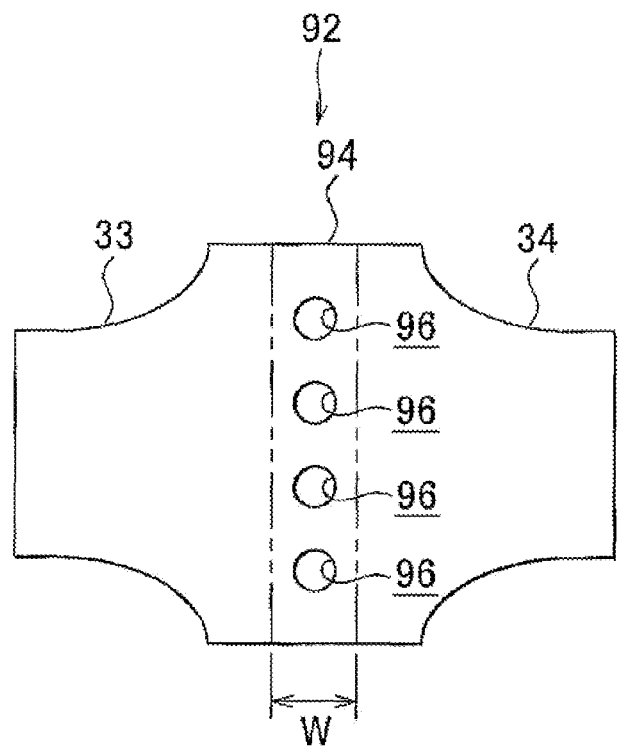
FIG. 10 is a plan view of reinforcing cloth shown in FIG. 9 in a deployed state.

That is, a cushion air bag 90 in the fourth example embodiment of the invention is formed with a reinforcing cloth 92, as shown in FIG. 9. This reinforcing cloth 92 connects the two pieces of additional cloth 33 and 34 in the first example embodiment of the invention described above by a connecting portion 94, as shown in FIGS. 9 and 10. Also, a plurality of gas supply holes 96 that are aligned in the seat width direction are formed in the connecting portion 94.

With this cushion air bag 90, gas that has been injected from the inflator 24 is supplied into the waist restraining portion 42 through these gas supply holes 96. In the cushion air bag 90, the structure other than that described above is the same as that of the cushion air bag 30 in the first example embodiment of the invention.

The structure described above is able to display the operation and effects described below, in addition to the operation and effects of the first example embodiment of the invention described above. That is, the height of the apex of the gas introducing portion 44 when inflated is able to be restricted by the connecting portion 94, so the height of the apex of the gas introducing portion 44 when inflated is able to be even more effectively suppressed.

The width W of the connecting portion 94 may be set to an appropriate dimension that enables the height of the apex of the gas introducing portion 44 when the gas introducing portion 44 is inflated to be restricted.

Next, a modified example of the fourth example embodiment of the invention will be described.

Figure 11:
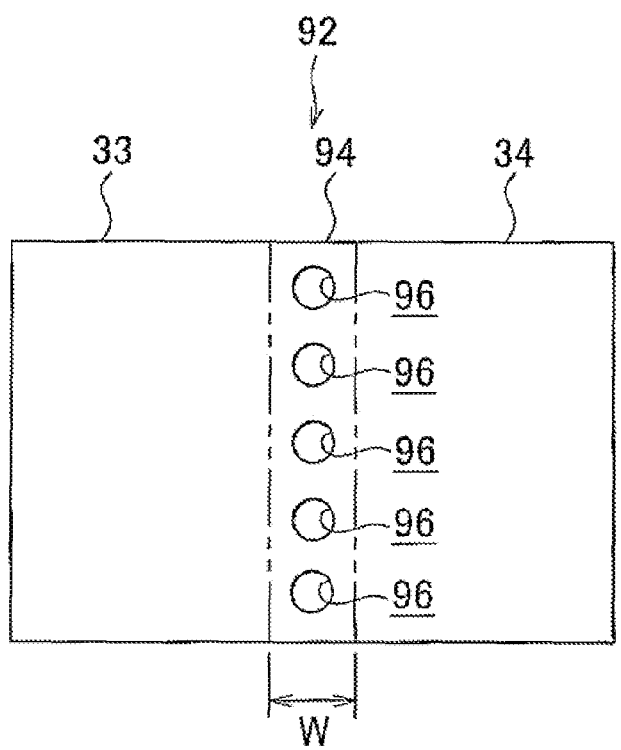
FIG. 11 is a plan view of a modified example of the reinforcing cloth shown in FIG. 10, and shows the reinforced cloth in a deployed state.

As shown in FIG. 11, the reinforcing cloth 92 may also connect the two pieces of additional cloth 33 and 34 formed in rectangular shapes when viewed from above by the connecting portion 94, as in the first modified example (see FIGS. 4A to 4C) and the second modified example (see FIGS. 5A to 5C) of the first example embodiment of the invention described above.

Figure 12A:
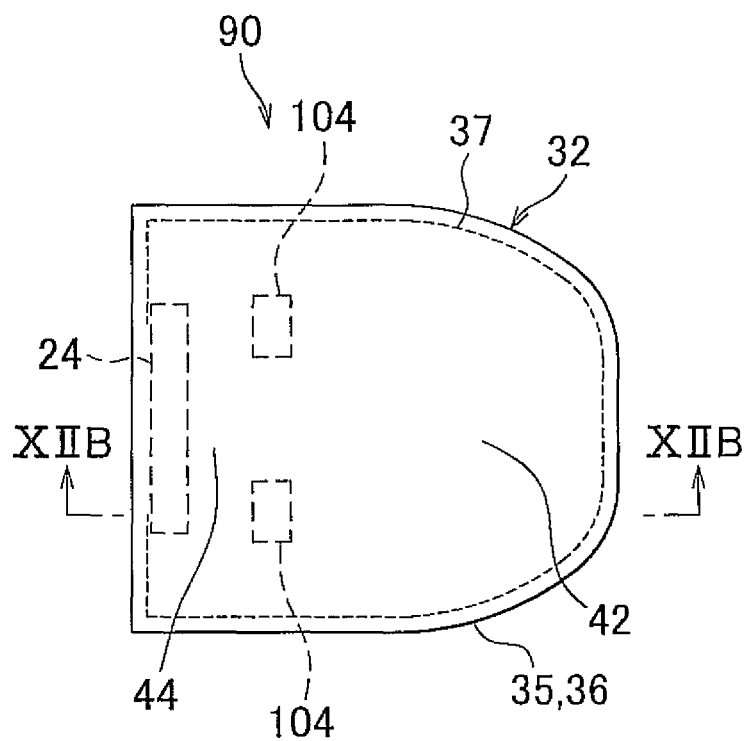
FIG. 12A is a plan view of a first modified example of the cushion air bag shown in FIG. 9.
Figure 12B:
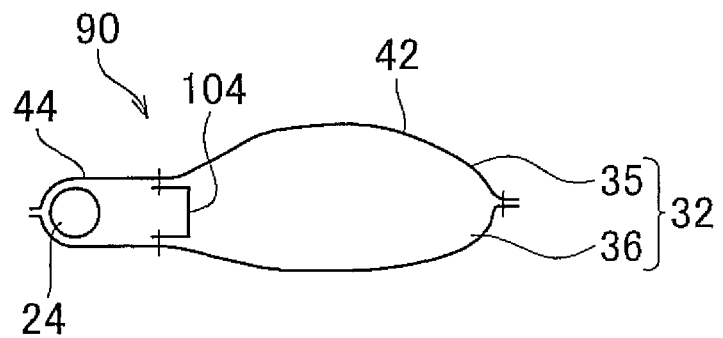
FIG. 12B is a sectional view taken along line 12B-12B of the cushion air bag shown in FIG. 12A.

Also, as shown in FIGS. 12A and 12B, a connecting member 104 (corresponding to the connecting portion of the invention) that connects the two pieces of base cloth 35 and 36 together may also be provided inside a portion corresponding to the gas introducing portion 44 of the cushion air bag 90.

In this modified example, a plurality (i.e., a pair) of the connecting members 104 are provided aligned in the seat width direction, but it is also possible to provide only one in the central portion in the seat width direction, or to provide three or more aligned in the seat width direction.

Figure 13A:
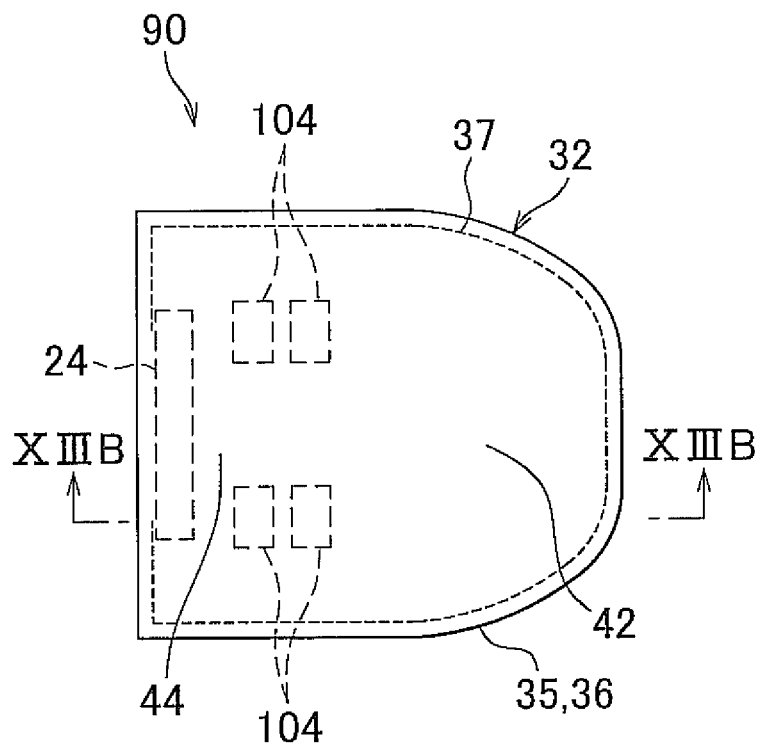
FIG. 13A is a plan view of a second modified example of the cushion airbag shown in FIG. 9.
Figure 13B:
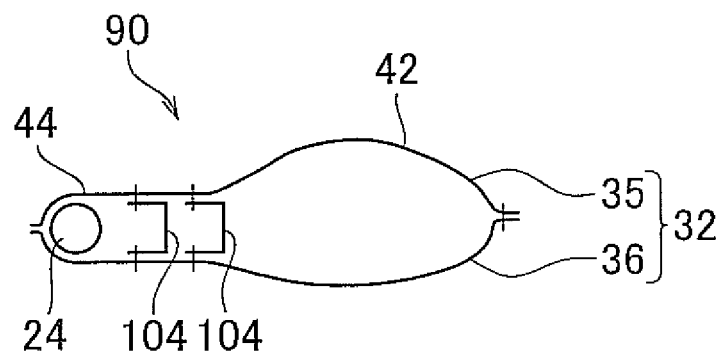
FIG. 13B is a sectional view taken along line 13B-13B of the cushion air bag shown in FIG. 13A.

Also, as shown in FIGS. 13A and 13B, a plurality of the connecting members 104 may be provided aligned in the seat width direction and the seat longitudinal direction.

With these structures as well, the height of the apex of the gas introducing portion 44 when inflated is able to be restricted.

Figure 14A:
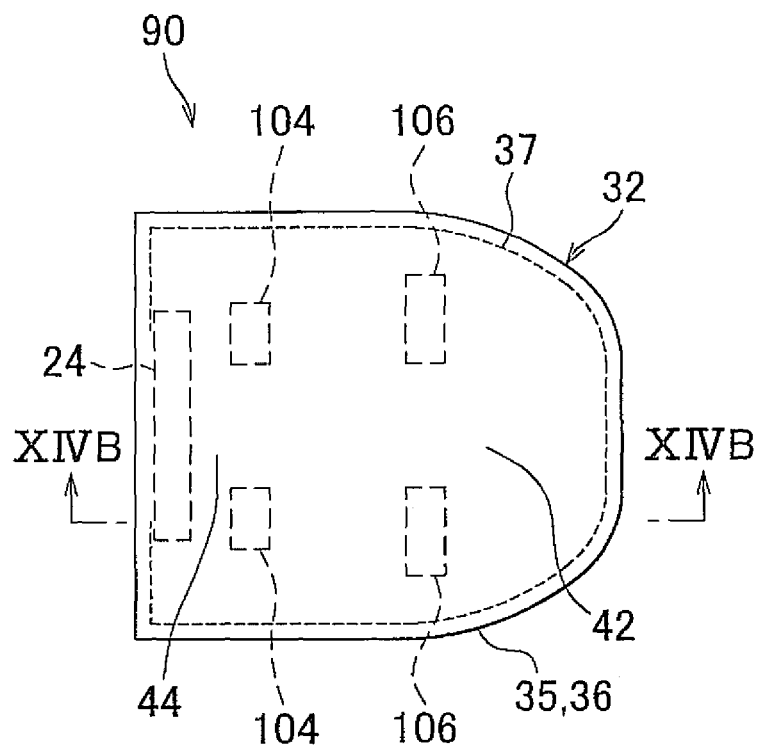
FIG. 14A is a plan view of a third modified example of the cushion air bag shown in FIG. 9.
Figure 14B:
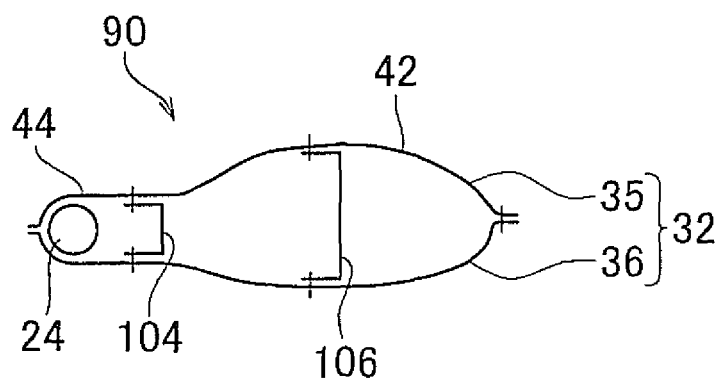
FIG. 14B is a sectional view taken along line 14B-14B of the cushion air bag shown in FIG. 14A.

Also, as shown in FIGS. 14A and 14B, a connecting member 106 that connects the two pieces of base cloth 35 and 36 together may be provided inside of a portion corresponding to the waist restraining portion 42 of the cushion air bag 90.

This kind of structure also enables the shape of the waist restraining portion 42 when inflated to be restricted.

While the invention has been described with reference to example embodiments thereof, it should be understood that the invention is not limited to these example embodiments.

Also, example embodiments in which combinations of the plurality of example embodiments described above are possible are of course also able to be carried out in appropriate combinations.

What is claimed is:

1. A vehicle seat provided with an internal cushion air bag apparatus, comprising:
   a cushion panel extending in a longitudinal direction of the vehicle seat and the cushion panel forming a bottom portion of a seat cushion;
   an inflator provided at a front portion of the cushion panel and the inflator injecting gas during a frontal collision of a vehicle; and
   a cushion air bag having a waist restraining portion and a gas introducing portion, the waist restraining portion arranged at a central portion of the cushion panel, and the gas introducing portion connecting the waist restraining portion with the inflator,
   wherein the cushion air bag is provided on the cushion panel,
   when the cushion air bag is inflated, an apex of the waist restraining portion reaches a higher height than an apex of the gas introducing portion in a vertical direction of the vehicle seat, and
   when the cushion air bag is inflated, the apex of the waist restraining portion is positioned rearward with respect to the apex of the gas introducing portion in the longitudinal direction of the vehicle seat,
   the cushion air bag includes an air bag main body and a connecting portion,
   the air bag main body is formed in a bag shape by two pieces of base cloth being sewn together at peripheral edge portions of the two pieces of base cloth,
   the connecting portion is provided inside of a portion corresponding to the gas introducing portion of the air bag main body,
   the connecting portion connects the two pieces of base cloth together at a position between the inflator and the apex of the waist restraining portion in the longitudinal direction of the vehicle seat, and
   the connecting portion has a height lower than a height of the apex of the waist restraining portion when the cushion air bag is inflated.

2. A cushion air bag apparatus for a vehicle seat, comprising:
   an inflator;
   an air bag main body formed in a bag shape by two pieces of base cloth being sewn together at peripheral edge portions of the two pieces of base cloth; and
   a connecting portion,
   wherein the inflator is provided inside the air bag main body, the air bag main body has a waist restraining portion and a gas introducing portion, the waist restraining portion is formed on a side opposite the inflator, the gas introducing portion connects the waist restraining portion and the inflator together,
   when the air bag main body is inflated, an apex of the gas introducing portion reaches a height lower than an apex of the waist restraining portion in a vertical direction of the vehicle seat, and
   when the air bag main body is inflated, the apex of the waist restraining portion is positioned rearward with respect to the apex of the gas introducing portion in a longitudinal direction of the vehicle seat,
   the connecting portion is provided inside of a portion corresponding to the gas introducing portion of the air bag main body,
   the connecting portion connects the two pieces of base cloth together at a position between the inflator and the apex of the waist restraining portion in the longitudinal direction of the vehicle seat, and
   the connecting portion has a height lower than a height of the apex of the waist restraining portion when the cushion air bag is inflated,
   the air bag main body includes two pieces of additional cloth,
   the two pieces of additional cloth are provided inside the two pieces of base cloth, and
   the two pieces of additional cloth extend between the inflator and the connecting portion in the longitudinal direction of the vehicle seat, and the two pieces of additional cloth are configured to suppress the gas introducing portion from inflating.

* * * * *